United States Patent
Brida et al.

(10) Patent No.: US 10,006,825 B2
(45) Date of Patent: Jun. 26, 2018

(54) PRESSURE SENSOR INCLUDING A STRUCTURE FOR CONTROLLING AN ADHESIVE LAYER RESISTANT TO TEMPERATURE VARIATIONS

(71) Applicant: AUXITROL S.A., Bourges (FR)

(72) Inventors: Sebastiano Brida, Salles sur l'Hers (FR); David Seyer, Rians (FR)

(73) Assignee: AUXITROL S.A., Bourges (FR)

( * ) Notice: Subject to any disclaimer, the term of this patent is extended or adjusted under 35 U.S.C. 154(b) by 113 days.

(21) Appl. No.: 15/031,109

(22) PCT Filed: Oct. 24, 2014

(86) PCT No.: PCT/EP2014/072913
§ 371 (c)(1),
(2) Date: Apr. 21, 2016

(87) PCT Pub. No.: WO2015/059301
PCT Pub. Date: Apr. 30, 2015

(65) Prior Publication Data
US 2016/0273989 A1  Sep. 22, 2016

(30) Foreign Application Priority Data
Oct. 25, 2013 (FR) ..................... 13 60436

(51) Int. Cl.
*G01L 19/04* (2006.01)
*G01L 19/14* (2006.01)

(52) U.S. Cl.
CPC ............ *G01L 19/04* (2013.01); *G01L 19/146* (2013.01); *G01L 19/147* (2013.01)

(58) Field of Classification Search
CPC ......... G01L 19/00; G01L 19/04; G01L 19/06; G01L 19/14; G01L 19/146; G01L 19/147
See application file for complete search history.

(56) References Cited

U.S. PATENT DOCUMENTS 4,481,497 A  11/1984  Kurtz et al.
5,225,373 A * 7/1993  Takahashi .......... G01L 19/0061
                                                257/E23.055
(Continued)

FOREIGN PATENT DOCUMENTS

DE        19848256      8/1999
DE     102011078055     1/2012
(Continued)

OTHER PUBLICATIONS

International Search Report and Written Opinion with English Language Translation, dated Feb. 5, 2015, Application No. PCT/EP2014/072913.

(Continued)

*Primary Examiner* — Nguyen Ha
(74) *Attorney, Agent, or Firm* — Womble Bond Dickinson (US) LLP

(57) ABSTRACT

The invention relates to a pressure sensor including: a sensitive element including a mounting substrate, said mounting substrate including a top surface and a bottom surface, the sensitive element also including a deformable diaphragm that is connected to the top surface of the mounting substrate; a housing, in which the sensitive element is placed, said housing including a base; an intermediate structure placed between the base of the housing and the mounting substrate, said intermediate structure including a base, the base including a top surface and a bottom surface that is connected to the base of the housing, said intermediate structure being configured such as to keep the mounting substrate at a predetermined distance from the top surface of the intermediate structure; and an adhesive layer extending onto the top surface of the intermediate structure. Said adhesive layer has a thickness controlled by the predetermined distance at which the mounting substrate is kept from the top surface of the intermediate structure. The (Continued)

invention also relates to a method for making such a pressure sensor.

12 Claims, 9 Drawing Sheets

(56) References Cited

U.S. PATENT DOCUMENTS

| | | | |
|---|---|---|---|
| 5,852,320 | A | 12/1998 | Ichihashi |
| 5,986,316 | A * | 11/1999 | Toyoda ............... G01L 19/0084 257/419 |
| 8,552,514 | B2 * | 10/2013 | Ooya ...................... G01L 19/04 257/419 |
| 2003/0047354 | A1 * | 3/2003 | Havas ........................ C09J 5/06 174/260 |
| 2006/0243054 | A1 * | 11/2006 | Saito ................... G01L 19/0084 73/754 |
| 2008/0016683 | A1 * | 1/2008 | Brida .................... G01L 19/146 29/739 |

FOREIGN PATENT DOCUMENTS

| | | | |
|---|---|---|---|
| EP | 0619477 | | 10/1994 |
| GB | 2266152 | A * | 10/1993 ......... G01L 19/0038 |
| JP | H06186104 | | 7/1994 |
| JP | 10332505 | A * | 12/1998 ............... G01L 9/04 |
| JP | 2003083828 | | 3/2003 |

OTHER PUBLICATIONS

French Search Report and Written Opinion, dated Jul. 10, 2014, French Application No. 1360436.

* cited by examiner

-- PRIOR ART --

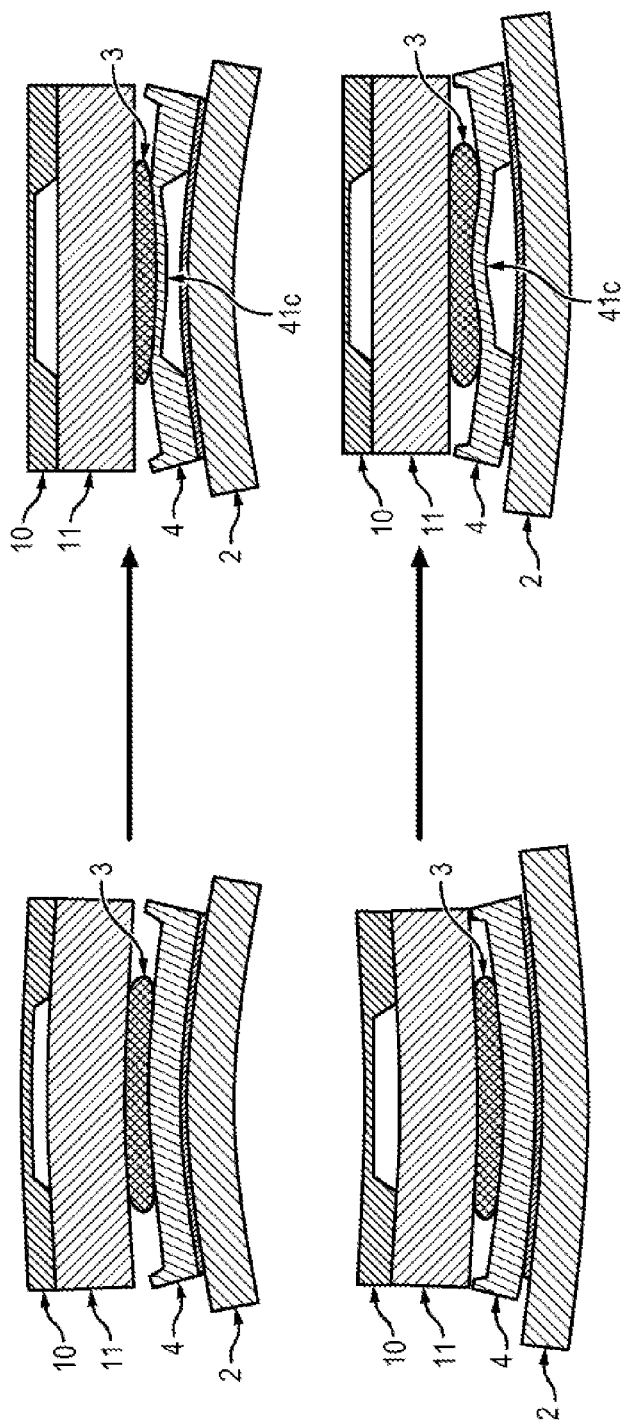

PRESSURE SENSOR INCLUDING A STRUCTURE FOR CONTROLLING AN ADHESIVE LAYER RESISTANT TO TEMPERATURE VARIATIONS

GENERAL TECHNICAL FIELD

The invention relates to a pressure sensor comprising a mounting substrate and a deformable diaphragm arranged on the mounting substrate.

PRIOR ART

In relation with FIG. 1, a pressure sensor comprises a sensitive element 1 comprising a deformable diaphragm 10 of which the deformation is representative of a pressure applied onto the latter. The diaphragm is placed on a mounting substrate 11 typically made from a material with a glass base. The diaphragm 10 furthermore supports elements for measuring pressure 12a, 12b, 12c.

The sensitive element 1 is assembled to a metal housing 2. The mounting substrate is connected to the housing by the intermediary of an adhesive layer 3 for example with a silicone base that has flexible properties when subjected to variations in temperature (RTV silicone glue).

The use of this adhesive layer 3 participates in the precision of the sensor.

Indeed, the precision of the sensor is sensitive to the thermal cycles and a variation in temperature induces a constraint between the sensitive element and the housing (constraint due to a difference between the thermal expansion coefficients of the two materials); this constraint is transmitted by the mounting substrate 11 and creates a mechanical stress and therefore a mechanical deformation of the deformable diaphragm 10, deformation which is transmitted on elements for measuring pressure, and which generates a residual offset of the signal coming from the sensitive element, a non-zero residual offset that is proportional to the variations in temperature applied to the stresses induced by the thermo-mechanical constraints.

This constraint can however be more or less absorbed by the adhesive layer 3.

However, if the thickness of the adhesive layer is too thin, the constraint is partially transferred to the sensitive element and creates a deformation on this sensitive element, deformation that generates, on elements for measuring pressure, a residual offset on the signal measured, a non-zero residual offset and that is proportional to the variations in temperature applied and to the stresses induced by the thermo-mechanical constraints; this residual offset independent of the pressure creates a measurement error called temperature hysteresis.

There consequently is a need to be able to control the thickness of the adhesive layer used in the assembly of a pressure sensor of the aforementioned type.

PRESENTATION OF THE INVENTION

The invention proposes to overcome this disadvantage.

To this effect, the invention proposes a pressure sensor comprising:
a sensitive element comprising a mounting substrate, said mounting substrate comprising a top surface and a bottom surface, the sensitive element further comprising a deformable diaphragm connected to the top surface of the mounting substrate;
a housing in which the sensitive element is placed, with the housing comprising a base;
an intermediate structure placed between the base of the housing and the mounting substrate, said intermediate structure comprising a base, with the base comprising a top surface and a bottom surface connected to the base of the housing, said intermediate structure further comprising a plurality of wedges arranged to keep the mounting substrate at a predetermined distance from the top surface of the base;
an adhesive layer extending over the top surface of the base and between the wedges, said adhesive layer being of a thickness controlled by the predetermined distance at which the mounting substrate is kept from the top surface of the base.

The invention is advantageously supplemented by the following characteristics, takes individually or in any possible technically permissible combination:
the intermediate structure is furthermore configured to define a space between the bottom surface of the mounting substrate and the top surface of the intermediate structure;
the intermediate structure is rectangular and comprises four wedges, with each wedge placed in a corner of said intermediate structure, with the wedges keeping the mounting substrate at the predetermined distance from the top surface of the intermediate structure;
the intermediate structure is deformable;
the intermediate structure comprises a thin portion and a thick portion, said thin portion supporting the adhesive layer;
the intermediate structure further comprises an abutment arranged at the centre of the thin portion of said intermediate structure;
the intermediate structure is a substrate made of material chosen from the following group: silicon, glass, quartz, Pyrex™, alumina, sapphire, SiC;
the adhesive layer has a base of silicone, a material that has flexible properties when subjected to variations in temperature;
the bottom surface of the intermediate structure is connected to the base of the housing by the intermediary of a binder layer;
the binder layer is for example a layer of epoxy resin;
the adhesive layer has a thickness equal to the predetermined distance at which the sensitive element is kept from the top surface of the intermediate structure;
it comprises a central recess in such a way that said pressure sensor is configured to measure a pressure differentially.

The invention also relates to a method for manufacturing a pressure sensor according to one of the preceding claims, comprising the following steps:
providing a sensitive element comprising a mounting substrate said mounting substrate comprising a top surface and a bottom surface, the sensitive element further comprising a deformable diaphragm connected to the top surface of the mounting substrate;
providing a housing comprising a base;
providing an intermediate structure comprising a base, with the base comprising a top surface, said intermediate structure being configured such as to keep the mounting substrate at a predetermined distance from the top surface of the intermediate structure;
depositing an adhesive layer on the top surface of the intermediate structure, said adhesive layer being of a thickness controlled by the predetermined distance at which the mounting substrate is kept from the top surface of the intermediate structure;

connecting the intermediate structure to the mounting substrate;

connecting the intermediate structure to the base of the housing.

PRESENTATION OF THE FIGURES

Other characteristics, purposes and advantages of the invention shall come from the following description, which is purely for the purposes of illustration and is non-limiting, and which must be read with regards to the annexed drawings wherein in addition to the FIG. 1 already discussed:

Figure 6:
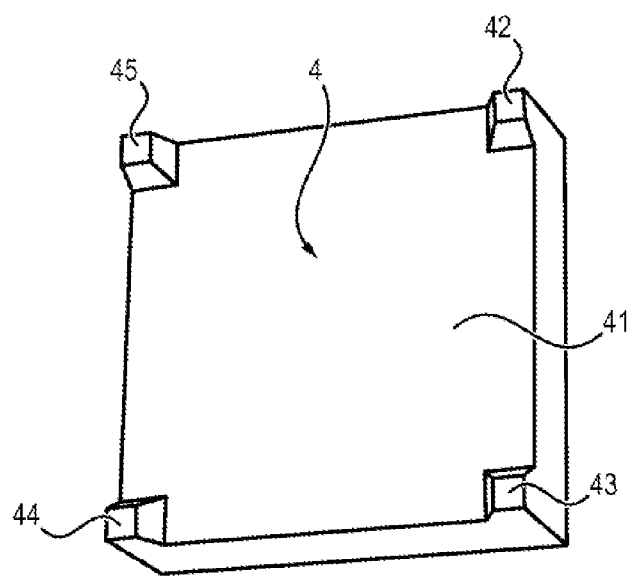
FIG. 6 shows a perspective view of an intermediate structure of the pressure sensor according to the first embodiment of the invention.
Figure 6A:
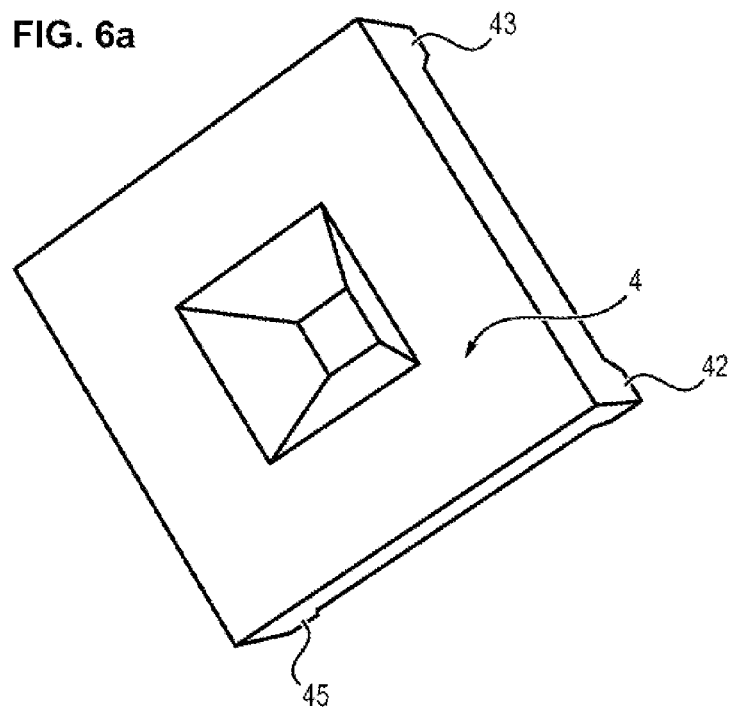
Figure 6B:
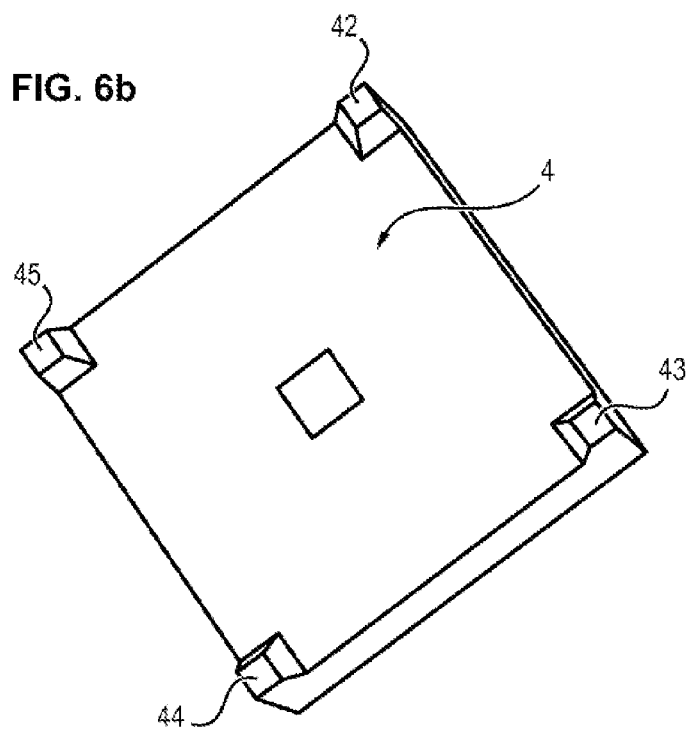
Figure 7:
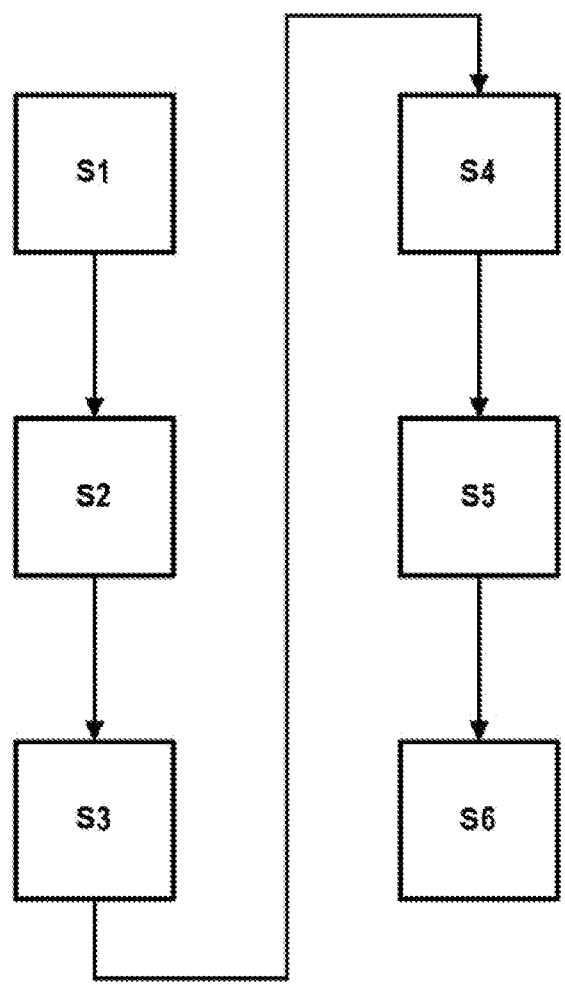

FIGS. 6a and 6b respectively show perspective top and bottom views of an intermediate structure of the pressure sensor according to the second embodiment of the invention;

FIG. 7 diagrammatically shows the steps of a method for manufacturing a pressure sensor according to the invention;

FIG. 8 comparatively shows the pressure sensor according to the third embodiment of the invention as well as a pressure sensor according to a fourth embodiment, respectively in two deformed states.

Over all of the figures, similar elements bear identical references.

DETAILED DESCRIPTION OF THE INVENTION

Figure 1:
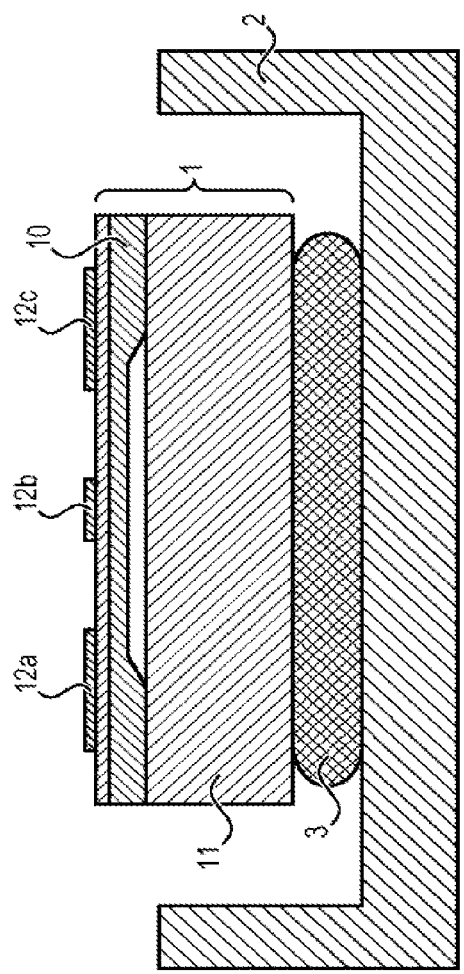
FIG. 1 shows a pressure sensor according to the prior art.
Figure 2:
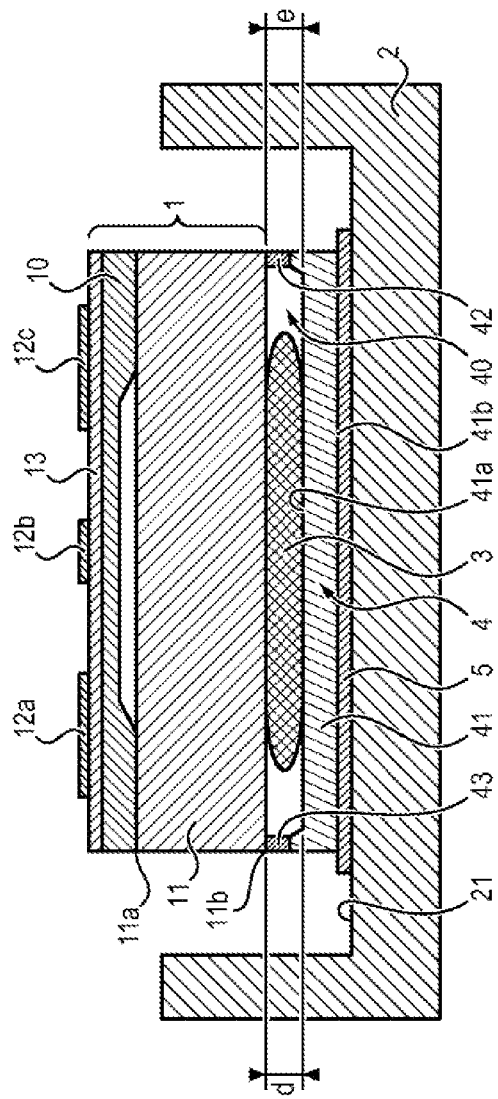
FIG. 2 shows a pressure sensor according to a first embodiment of the invention.

FIG. 2 shows a pressure sensor according to a first embodiment of the invention.

Such a sensor comprises:
a sensitive element 1;
a housing 2 in which the sensitive element is placed, with the housing comprising a base 21;
an adhesive layer 3 comprising a thickness e; and
an intermediate structure 4.

The sensitive element comprises a mounting substrate 11 which comprises a top surface 11a and a bottom surface 11b, the sensitive element 1 further comprising a deformable diaphragm connected to the top surface 11a of the mounting substrate 11.

The mounting substrate 11 can be made of a material with a base of glass, Silicon, quartz, Pyrex™, sapphire, alumina, SiC.

The deformable diaphragm 10 is connected to the mounting substrate 11 by anodic sealing or by means of a molecular or atomic bond with or without an intermediate layer, or by sintering or by brazing.

The deformable diaphragm 10 is typically formed using a substrate for example constituted of monocrystalline Silicon such as SOI (Silicon On Insulator) and PSOI (Poly Silicon On Insulator), sapphire such as SOS (Silicon On Sapphire), or of another material such as SiCOI (SiC on Insulator) or SiC.

An electrically insulating layer 13 is furthermore arranged above the deformable diaphragm 10. Such a layer is for example made of $SiO_2$ in the case of an SOI or PSOI diaphragm. On this insulating layer 13 different materials such as nitrides, oxides, metal layers, mono- and polycrystalline Silicon are arranged in such a way as to form elements for measuring pressure 12a, 12b, 12c (in FIG. 2, only three elements for measuring pressure are represented although four elements for measuring pressure are in reality present).

The housing 2 is more preferably made of metal material.

The intermediate structure 4 comprises a base 41, with the base 41 comprising a top surface 41a whereon the adhesive layer 3 extends and a bottom surface 41b connected to the base of the housing.

In order to control the thickness e of the adhesive layer, the intermediate structure 4 is configured such as to keep the mounting substrate 11 at a predetermined distance d from the top surface 41a of the intermediate structure 4.

In particular, the configuration of the intermediate structure 4 makes it possible to define a free space 40 between the bottom surface 11b of the mounting substrate 11 and the top surface 41a of the base 41.

It is in particular in this space 40 that the adhesive layer 3 is deposited.

In this way, the intermediate structure 4 makes it possible to have with precision the thickness e of the adhesive layer 3.

Preferably, the intermediate structure 4 comprises at least two wedges 42, 43 in contact with the mounting substrate 11. It is therefore thanks to at least two wedges 42, 43 that the predetermined distance d between the mounting substrate 11 and the top surface 41a of the intermediate structure 4 is obtained which makes it possible to control the thickness e of the adhesive layer 3 placed between the top surface 41a of the base 41 and the bottom surface 11b of the mounting substrate 11.

Indeed, the wedges 42, 43 makes it possible to define the free space 40 between the top surface 41a of the intermediate structure 4 and the bottom surface 11b of the mounting substrate 11, the adhesive layer being arranged in this free space 40, between the wedges 42, 43. In addition, as several wedges are placed around the adhesive layer, a space is also defined between the wedges 42, 43. This space between each pair of wedges makes possible a spreading out of the adhesive layer according to a horizontal plane, i.e., parallel to the top surface 41a, without the risk of an accumulation of adhesive between the intermediate structure 4 and the deformable diaphragm 10, more precisely between the top surface of each wedge and the bottom surface of the deformable diaphragm.

This configuration with several wedges offers a certain advantage with respect to a configuration with a single wedge which is closed on itself. Indeed, when an adhesive layer surrounded by such a single annular wedge is spread out and/or expands, this adhesive has no other choice but to slide between the top annular surface of the wedge closed on itself, having for consequence an undesirable variation in the thickness of the adhesive layer and therefore the introduction of errors into the measurements acquired by the sensor.

The adhesive layer 3 is more preferably with a base of silicone, or any adhesive product that has flexible properties when subjected to variations in temperature. By way of example, a thickness e of such an adhesive layer greater than 100 µm makes it possible to minimise the error due to the temperature cycles and makes it possible to obtain negligible hysteresis in temperature (<0.05% full scale for sensors of ranges of pressures from a few mbars to a few bars, and a temperature between −55° C. and +150° C.)

The presence of the adhesive layer 3 participates in the precision of the pressure sensor without any other function of a particular bond as is the case in prior art.

Figure 3:
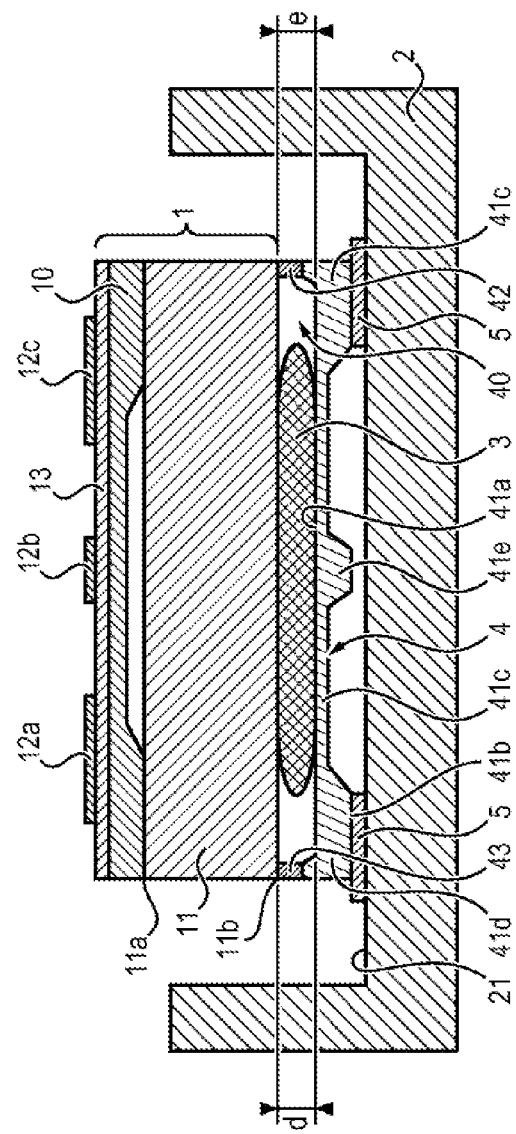
FIG. 3 shows a pressure sensor according to a second embodiment of the invention.

FIG. 3 shows a pressure sensor according to a second embodiment of the invention.

This second embodiment is similar to the first embodiment but differs from it however by the intermediate structure 4 which is in this second embodiment deformable.

The adhesive layer is then confined between two deformable elements: the diaphragm 10 and the intermediate structure 4, with the two deformable elements being in contact by the wedges.

The adhesive layer 3 can expand and contract by effect of the temperature; it induces a stress that can be transmitted to the sensitive element 1 by the intermediary of the wedges. However the deformable nature of the intermediate structure makes it possible to absorb all or a portion of this stress so that it is not transmitted to the element 1; this is important during the use of the sensor, and in particular during its operation at different temperatures.

According to this embodiment, the intermediate structure 4 comprises, in addition to the top surface 41a and the bottom surface 41b, a thin portion 41c and a base 41d forming a thick portion 41d of the intermediate structure 4.

The adhesive layer 3 rests, preferably, on the thin portion 41c. The thick portion 41d is of a thickness greater than the thin portion 41c. It is this difference in thickness that makes possible the deformation of the thin portion 41c and thus provides a damping function.

FIG. 8 comparatively shows a sensor according to the second embodiment (on the right), and another embodiment without a thin portion 41c, both subjected to deformations of the bending type domed towards the diaphragm (figures at the top) and of the bending type domed towards the housing (figures at the bottom). Thanks to the portion 41c that provides a damping function, the deformable diaphragm 10 of the sensor according to the second embodiment is deformed in proportions that are less than the diaphragm of the embodiment shown on the left, devoid of a central thin portion. This further contributes to having hysteresis as a reduced temperature and therefore improves the performance of the pressure sensor.

In order to protect the intermediate structure 4, which here is deformable, from any overpressure applied to the thin portion 41c, the intermediate structure 4 comprises an abutment 41e at its centre. As such, in the event of an overpressure, the abutment 41e will come into contact with the base 21 of the housing 2. The abutment 41e can either be formed of a single part with the rest of the intermediate structure or be added and then connected to the thin portion 41c of the intermediate structure 4.

Of course, in this second embodiment, the intermediate structure 4 comprises at least one wedge 42, 43 on contact with the mounting substrate 11.

Figure 4:
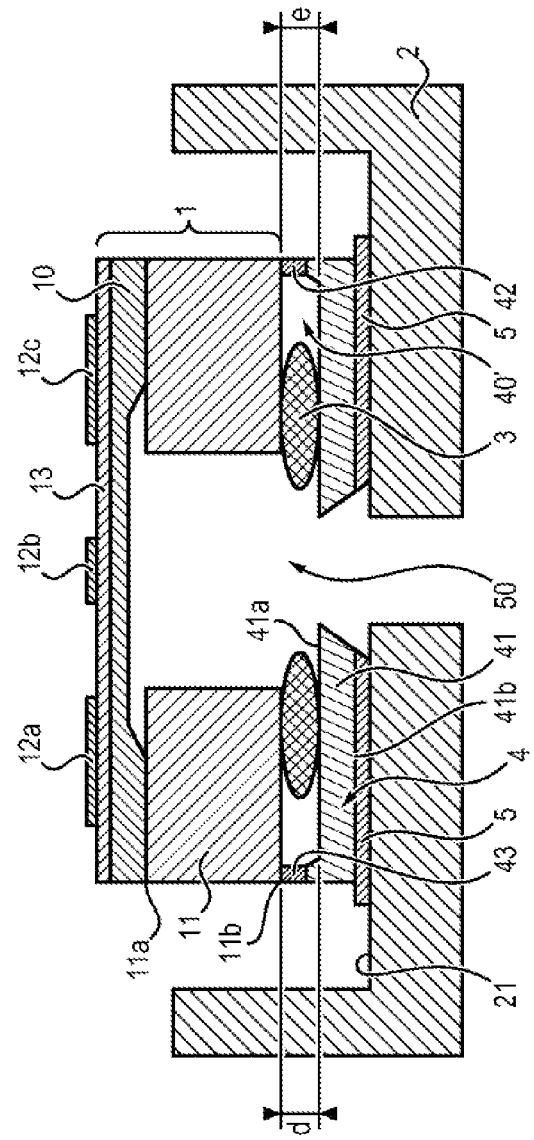
FIG. 4 shows a pressure sensor according to a third embodiment of the invention.

FIG. 4 shows a pressure sensor according to a third embodiment of the invention.

This third embodiment is similar to the first embodiment and comprises in addition a central recess 50 in such a way that the pressure sensor is configured to measure a pressure differentially (the sensor of FIG. 2 described hereinabove allows for an absolute measurement of pressure). Of course, as is shown in FIG. 4, the deformable diaphragm 10 is not passed through by the recess 50.

Figure 5:
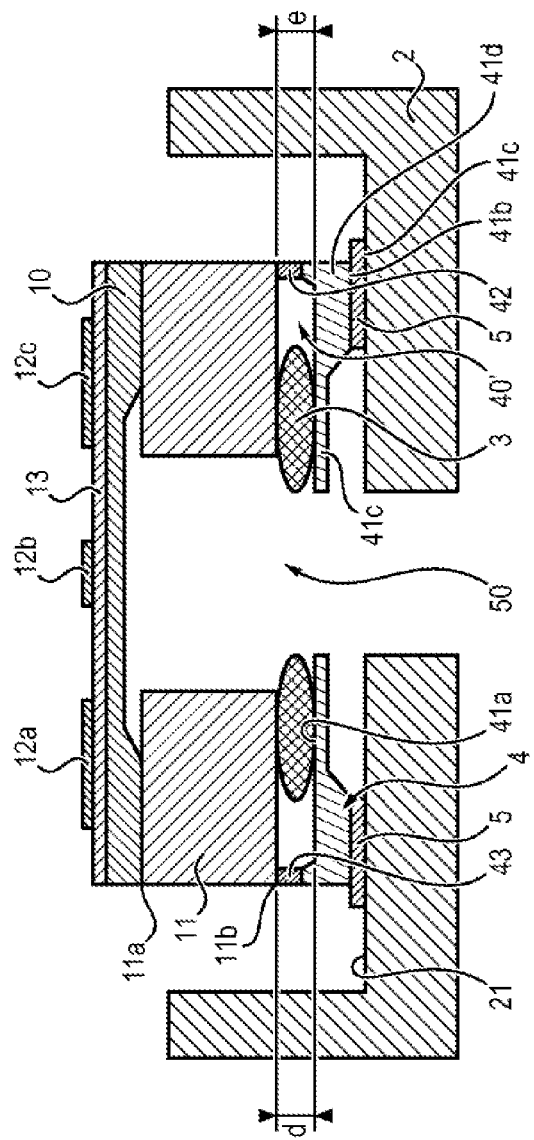
FIG. 5 shows a pressure sensor according to a fourth embodiment.

FIG. 5 shows a pressure sensor according to a fourth embodiment of the invention.

This fourth embodiment is similar to the second embodiment and comprises in addition a recess 50 central in such a way that the pressure sensor is configured to measure a pressure differentially. In this figure, the abutment 4e is not visible, as this is a cross-section view. It is however understood that the recess is formed in the middle of the abutment.

Advantageously, as shown in FIGS. 6, 6a and 6b the intermediate structure 4 is rectangular or of a shape and of dimensions suited to support the mounting substrate 11. Advantageously, the intermediate structure 4 comprises several wedges (four in the example) 42, 43, 44, 45 which are more precisely four protuberances protruding from the intermediate structure 4. Each wedge is placed in a respective corner of the intermediate structure. In this embodiment, a passage is defined between each pair of wedges, the adhesive layer can therefore spread out and expand horizontally according to four different directions, via the four passages left free between each pair of adjacent wedges.

The intermediate structure 4 can be made from a material with a base of glass, silicon, quartz, Pyrex™, sapphire, alumina, SiC.

In a complementary manner, the bottom surface 41b of the intermediate structure 4 is connected to the base of the housing 2 by the intermediary of a binder layer 5. This binder layer 5 is preferably a layer of epoxy resin.

The invention also relates to a method for manufacturing a pressure sensor such as described hereinabove and in relation with FIG. 7.

Such a method of manufacturing comprises the following steps:
  providing S1 the sensitive element 1;
  providing S2 the housing 2;
  providing S3 the intermediate structure.

Once the main elements of the sensor are provided, the method comprises the following steps:
  depositing S4 the adhesive layer 3 on the top surface of the intermediate structure 4, said adhesive layer 3 being of a thickness controlled by the predetermined the distance d at which the mounting substrate 11 is kept from the top surface of the base 41, 41d.
  connecting S5 to the mounting substrate 11 the intermediate structure provided with said at least one wedge 42, 43, 44, 45;
  connecting S6 to the base 21 of the housing the intermediate structure 4.

The order of the steps of the method described hereinabove is not limiting. In particular, the order of the steps of the depositing of the adhesive layer (step S4), of connecting the intermediate structure 4 (step S5) and of connecting the intermediate structure to the base (step S6) can be modified without this having an impact on the final structure obtained.

The controlling of the thickness of the adhesive layer is controlled in step S5, when the mounting substrate 11 is placed on the intermediate structure.

As indicated hereinabove, the plurality of wedges 42, 43 allows for a control of the thickness of the glue 3 and authorises a spreading out of the glue. This controlling of the thickness and of the spreading out of the glue makes it possible in particular to prevent the glue from accumulating between the wedges 42, 43 and the mounting substrate 11 during the assembly of the different parts of the sensor.

The invention claimed is:

1. Pressure sensor comprising:
   a sensitive element comprising a mounting substrate said mounting substrate comprising a top surface and a bottom surface, the sensitive element further comprising a deformable diaphragm connected to the top surface of the mounting substrate;
   a housing in which the sensitive element is placed, with the housing comprising a base;
   a deformable intermediate structure placed between the base of the housing and the mounting substrate, said deformable intermediate structure comprising a base, with the base comprising a top surface and a bottom surface connected to the base of the housing, said deformable intermediate structure further comprising a plurality of wedges arranged to keep the mounting substrate at a predetermined distance from the top surface of the base;
   an adhesive layer extending over the top surface of the base and between the wedges, said adhesive layer being of a thickness controlled by the predetermined distance at which the mounting substrate is kept from the top surface of the base.

2. Pressure sensor according to claim 1, in which the intermediate structure is configured to define a space between the bottom surface of the mounting substrate and the top surface of the intermediate structure.

3. Pressure sensor according to claim 1, in which the intermediate structure is rectangular and comprises four wedges, with each wedge placed in a corner of said intermediate structure.

4. Pressure sensor as claimed in claim 1 the preceding claim, in which the intermediate structure further comprises a thin portion and a thick portion, said thin portion supporting the adhesive layer.

5. Pressure sensor as claimed in claim 4, in which the intermediate structure further comprises an abutment arranged at the centre of the thin portion of said intermediate structure.

6. Pressure sensor according to claim 1, in which the intermediate structure is a substrate made of material chosen from following group: silicon, glass, quartz, Pyrex™, alumina, sapphire, SiC.

7. Pressure sensor according to claim 1, in which the adhesive layer has a base of silicone, a material that has flexible properties when subjected to variations in temperature.

8. Pressure sensor according to claim 1, in which the bottom surface of the intermediate structure is connected to the base of the housing by an intermediate binder layer.

9. Pressure sensor as claimed in claim 8, in which the binder layer is a layer of epoxy resin.

10. Pressure sensor according to claim 1, in which the thickness of the adhesive layer has a thickness equal to the predetermined distance at which is kept the sensitive element from the top surface of the intermediate structure.

11. Pressure sensor according to claim 1, comprising a central recess in such a way that said pressure sensor is configured to measure a pressure differentially.

12. Method for manufacturing a pressure sensor according to claim 1, comprising the following steps:
   providing said sensitive element
   providing said housing;
   providing said deformable intermediate structure
   depositing said adhesive layer on the top surface of the deformable intermediate structure and between the wedges;
   connecting the deformable intermediate structure to the mounting substrate;
   connecting the deformable intermediate structure to the base of the housing.

* * * * *